(12) United States Patent
Parhy et al.

(10) Patent No.: US 8,831,099 B2
(45) Date of Patent: Sep. 9, 2014

(54) SELECTING A MACROBLOCK ENCODING MODE BY USING RAW DATA TO COMPUTE INTRA COST

(75) Inventors: Manindra Parhy, Fremont, CA (US); Atul Garg, Sunnyvale, CA (US); Prahlad Venkatapuram, San Jose, CA (US); Chung-Cheng Lou, Los Angeles, CA (US); Ignatius Tjandrasuwita, Atherton, CA (US)

(73) Assignee: Nvidia Corporation, Santa Clara, CA (US)

( * ) Notice: Subject to any disclaimer, the term of this patent is extended or adjusted under 35 U.S.C. 154(b) by 1238 days.

(21) Appl. No.: 12/337,560

(22) Filed: Dec. 17, 2008

(65) Prior Publication Data

US 2010/0150237 A1    Jun. 17, 2010

(51) Int. Cl.
*H04N 7/32* (2006.01)

(52) U.S. Cl.
USPC ........................................... 375/240.13

(58) Field of Classification Search
USPC .................................. 375/240.01, 240.13
IPC .......................................................... H04N 7/26
See application file for complete search history.

(56) References Cited

U.S. PATENT DOCUMENTS

| | | | |
|---|---|---|---|
| 5,859,668 A | 1/1999 | Aono et al. | |
| 5,930,390 A * | 7/1999 | Coelho | 382/168 |
| 6,025,888 A | 2/2000 | Pauls | |
| 6,765,964 B1 | 7/2004 | Conklin | |
| 7,170,937 B2 | 1/2007 | Zhou | |
| 7,289,674 B2 | 10/2007 | Karczewicz | |
| 7,706,442 B2 | 4/2010 | Kuo | |
| 7,953,284 B2 | 5/2011 | Au et al. | |
| 8,059,717 B2 | 11/2011 | Saigo et al. | |
| 8,315,467 B2 | 11/2012 | Nakamura et al. | |
| 8,355,449 B2 | 1/2013 | Moccagatta et al. | |
| 8,437,405 B1 | 5/2013 | Moccagatta et al. | |
| 8,761,253 B2 | 6/2014 | Garg et al. | |
| 2002/0159525 A1 | 10/2002 | Jeong | |
| 2003/0158608 A1 | 8/2003 | Ishikawa et al. | |
| 2003/0223645 A1 | 12/2003 | Sun et al. | |
| 2003/0235249 A1 | 12/2003 | Zhao et al. | |
| 2004/0028282 A1 | 2/2004 | Kato et al. | |
| 2004/0114576 A1 | 6/2004 | Itoh et al. | |
| 2004/0184548 A1 | 9/2004 | Kerbiriou et al. | |
| 2005/0089094 A1 | 4/2005 | Yoo et al. | |
| 2005/0157797 A1 | 7/2005 | Gaedke | |
| 2005/0249293 A1 | 11/2005 | Zeng et al. | |
| 2006/0018385 A1 | 1/2006 | Lee | |
| 2006/0126730 A1 | 6/2006 | Arakawa et al. | |
| 2006/0233447 A1 | 10/2006 | Matsubara | |

(Continued)

FOREIGN PATENT DOCUMENTS

| | | |
|---|---|---|
| JP | 2007013298 | 1/2007 |
| JP | 2008227670 | 9/2008 |
| KR | 1020060027795 | 3/2006 |
| WO | 2004104930 | 12/2004 |

*Primary Examiner* — Jay Patel
*Assistant Examiner* — Yulin Sun

(57) ABSTRACT

Non-encoded data for a macroblock of an image frame is accessed. A cost to intra-encode the macroblock is computed using at least a portion of the non-encoded data in place of reconstructed image data from another macroblock of the image frame. The cost can be compared against the cost to inter-encode the first macroblock in order to select how the first macroblock is to be encoded.

18 Claims, 5 Drawing Sheets

700

```
ACCESS RAW IMAGE DATA FROM THE
CURRENT MACROBLOCK
710
         ↓
COMPUTE INTRA-ENCODING COST(S)
USING RAW DATA OF CURRENT
MACROBLOCK INSTEAD OF
RECONSTRUCTED DATA OF
NEIGHBORING MACROBLOCKS
720
         ↓
SELECT AN ENCODING MODE FOR THE
MACROBLOCK
730
```

(56) References Cited

U.S. PATENT DOCUMENTS

| | | |
|---|---|---|
| 2006/0251330 A1 | 11/2006 | Toth et al. |
| 2006/0268990 A1 | 11/2006 | Lin et al. |
| 2007/0019726 A1 | 1/2007 | Cha et al. |
| 2007/0217508 A1 | 9/2007 | Shimada et al. |
| 2007/0229325 A1 | 10/2007 | Yokose et al. |
| 2008/0069211 A1* | 3/2008 | Kim et al. ............ 375/240.13 |
| 2008/0219576 A1* | 9/2008 | Jung et al. .................. 382/238 |
| 2008/0232463 A1* | 9/2008 | Lu et al. ............... 375/240.02 |
| 2008/0291995 A1 | 11/2008 | Graham et al. |
| 2009/0034856 A1 | 2/2009 | Moriya et al. |
| 2009/0154560 A1 | 6/2009 | Hong et al. |
| 2010/0158105 A1 | 6/2010 | Garg et al. |
| 2010/0166073 A1 | 7/2010 | Schmit et al. |

* cited by examiner

SELECTING A MACROBLOCK ENCODING MODE BY USING RAW DATA TO COMPUTE INTRA COST

FIELD

Embodiments according to the present invention generally relate to video encoding (video compression).

BACKGROUND

H.264, also known as Moving Pictures Experts Group-4 (MPEG-4) Part 10 or MPEG-4 Advanced Video Coding (AVC), is a standard for video compression (encoding). A video includes a series of pictures (or frames), with each frame consisting of a two-dimensional array of pixels. The pixels are divided into macroblocks (e.g., a 16×16 array of pixels). A macroblock number or identifier (ID) is associated with each macroblock. In general, the macroblocks are numbered starting at the top-left of the frame, in increasing order from left-to-right and top-to-bottom.

H.264 offers a rich choice of macroblock encoding modes or types. The encoding modes can be generally characterized as either inter-encoding, which takes advantage of temporal redundancy between frames, or intra-encoding, which takes advantage of spatial redundancy between macroblocks in the same frame. A decision regarding the type of encoding to be used is made by comparing the rate-distortion (RD) cost for each of the different modes under consideration, and then selecting the mode that has the lowest cost.

Macroblocks are typically encoded in a multi-stage pipeline. A macroblock (e.g., macroblock K) is encoded in one stage and then reconstructed from the encoded data in a subsequent stage. For intra-encoding, the mode decision process for macroblock K utilizes the reconstructed data for one or more of the macroblocks (e.g., macroblock K-1) that preceded macroblock K in the encoding pipeline.

In some cases, a macroblock needed for the mode decision process may still be in the process of being reconstructed, and hence the necessary reconstructed data is not available for the cost calculations. Consequently, the encoding pipeline may stall until the data needed for the cost calculations becomes available.

SUMMARY

According to embodiments of the present invention, a decision about how to encode a particular macroblock (the "current macroblock") is made using raw (non-encoded) data for the current macroblock in the cost calculations instead of reconstructed data from another macroblock. For example, instead of using the last (right-most) column of reconstructed pixel data for the preceding macroblock (e.g., the macroblock to the left of the current macroblock), the first (left-most) column of raw pixel data for the current macroblock is used in the mode decision process. Similarly, the bottom row of reconstructed pixel data for the macroblock above the current macroblock can be replaced in the mode decision process with the top row of raw pixel data for the current macroblock.

Because it is not necessary to wait for reconstructed data to become available for the mode decision process, related delays in the encoding pipeline are eliminated and encoder performance is improved. Also, the need to store and retrieve reconstructed data for the cost calculations is eliminated. As such, less memory is consumed and the amount of bus traffic is reduced.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 2 illustrates an example of a macroblock according to an embodiment of the invention.

FIGS. 3A and 3B illustrate a first intra-encoding prediction mode according to an embodiment of the invention.

FIGS. 4A and 4B illustrate a second intra-encoding prediction mode according to an embodiment of the invention.

DETAILED DESCRIPTION

Figure 1:
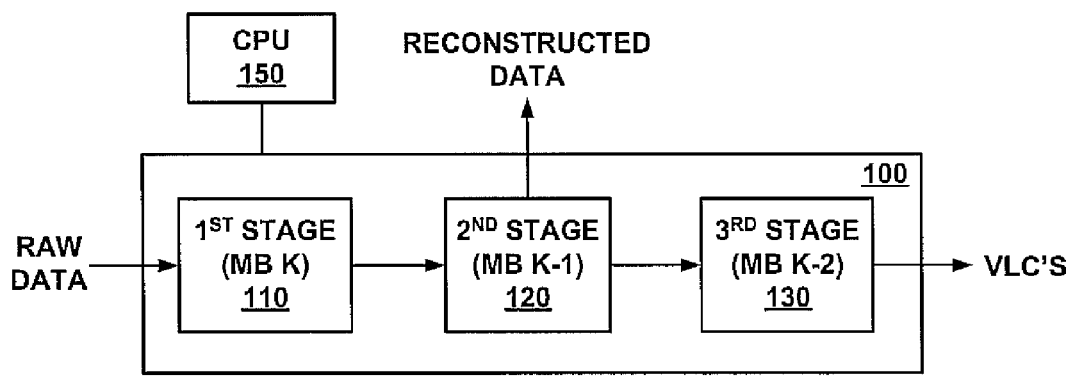
FIG. 1 is a functional block diagram of an encoding pipeline according to an embodiment of the invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "computing," "selecting," "using," "comparing," "encoding," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, the term "adjacent" is used herein to describe either a pair of vertices that have common edges or a pair of edges that have a common vertex, and the term "contiguous" is used herein to describe adjacent pixels connected together so as to form a row or column of pixels.

Figure 6:
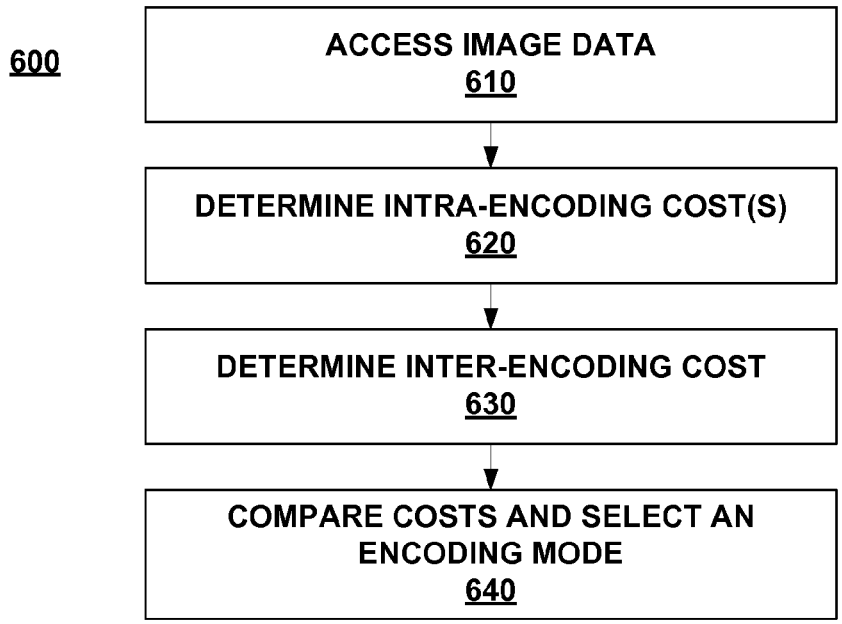
FIG. 6 is a flowchart of an example of a computer-implemented method for selecting an encoding mode according to an embodiment of the invention.
Figure 7:
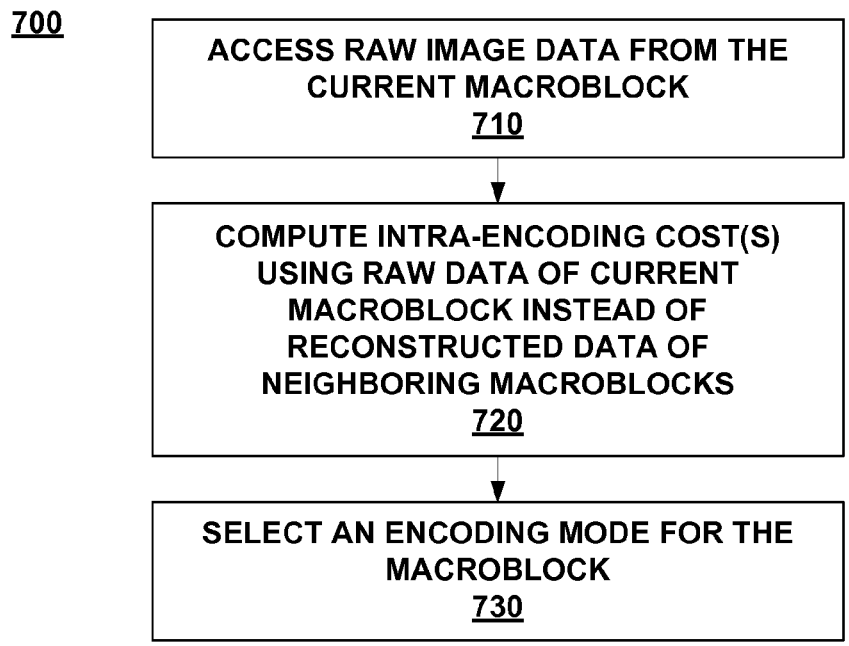
FIG. 7 is a flowchart of an example of a computer-implemented method for computing rate-distortion costs according to an embodiment of the invention.

Embodiments of the invention, such as those described by the flowcharts of FIGS. 6 and 7, can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a functional block diagram of an encoding pipeline 100 according to an embodiment of the invention. The encoding pipeline is controlled by a driver executed by a central processing unit (CPU) 150. The encoding pipeline itself may be implemented in hardware or software or a combination thereof.

In one embodiment, the encoding pipeline is utilized in an H.264 encoder that, in general, encodes (compresses) frames of image data (e.g., video data). H.264 may also be known as MPEG-4 Part 10 or MPEG-4 AVC. According to H.264, each video or picture frame is divided into macroblocks (an M×N array of pixels).

In the present embodiment, some type of macroblock ID is associated with each macroblock. Each macroblock ID is unique within a frame; that is, each macroblock in a frame can be uniquely identified by its macroblock ID. The macroblocks in a frame are arrayed in rows and columns. In one embodiment, encoding is performed starting with the macroblock in the first row and first column—that is, with reference to the orientation in which the image would be displayed, encoding starts at the left end of the top row of the image and proceeds in order from left-to-right and top-to-bottom. The macroblock IDs usually coincide with the encoding order.

Raw (non-encoded) image data (e.g., video data) is encoded using some type of compression scheme (e.g., H.264) to generate a set of encoding parameters such as, but not limited to, frame type (e.g., intra-coded I-frame, predicted P-frame or bi-predicted B-frame), macroblock prediction mode (e.g., inter-encoding versus intra-encoding), transform (e.g., discrete cosine transform) coefficients, texture coefficients, and motion vector information. The encoding parameters are then translated into variable length codes (VLCs), using Huffman coding for example. The encoded bitstream is a serialized bitstream containing the VLCs.

One of the functions performed by the encoding pipeline is to select a macroblock prediction mode (inter-encoding versus intra-encoding) for each macroblock of the raw data. A decision regarding the type of encoding to be used is made by comparing the rate-distortion (RD) cost for each of the modes and then selecting the mode that has the lowest cost. RD costs can be determined using any of a variety of cost functions known in the art, such as sum of absolute differences (SAD) or sum of absolute transformed differences (SATD) cost functions.

In the example of FIG. 1, the encoding pipeline includes a first stage 110, a second stage 120, and a third stage 130. While the first stage is operating on the data for macroblock (MB) K, the second stage is operating on the data for macroblock K-1, and the third stage is operating on the data for macroblock K-2.

As part of the mode decision process, the first stage of the FIG. 1 pipeline accesses raw image data and conducts a motion search; the second stage transforms (e.g., discrete cosine transforms) the results of the motion search; and the third stage encodes the transformed data as VLCs. These operations are known in the art. Each of these stages may perform operations in addition to those just mentioned.

In a conventional pipeline, reconstructed data from MB K-1 in the second stage would be used in the mode decision process for MB K in the first stage. In contrast, according to embodiments of the invention, the raw data accessed by the first stage is used in the mode decision process instead of the reconstructed data. In other words, according to embodiments of the invention, it is not necessary to wait for reconstructed data for a preceding macroblock (e.g., macroblock K-1, which is at the second pipeline stage) in order to make an encoding mode decision for the current macroblock K (which is at the first pipeline stage). As such, RD costs can be calculated at the first pipeline stage instead of at the second pipeline stage. As a result, the encoder can perform more efficiently.

Figure 2:
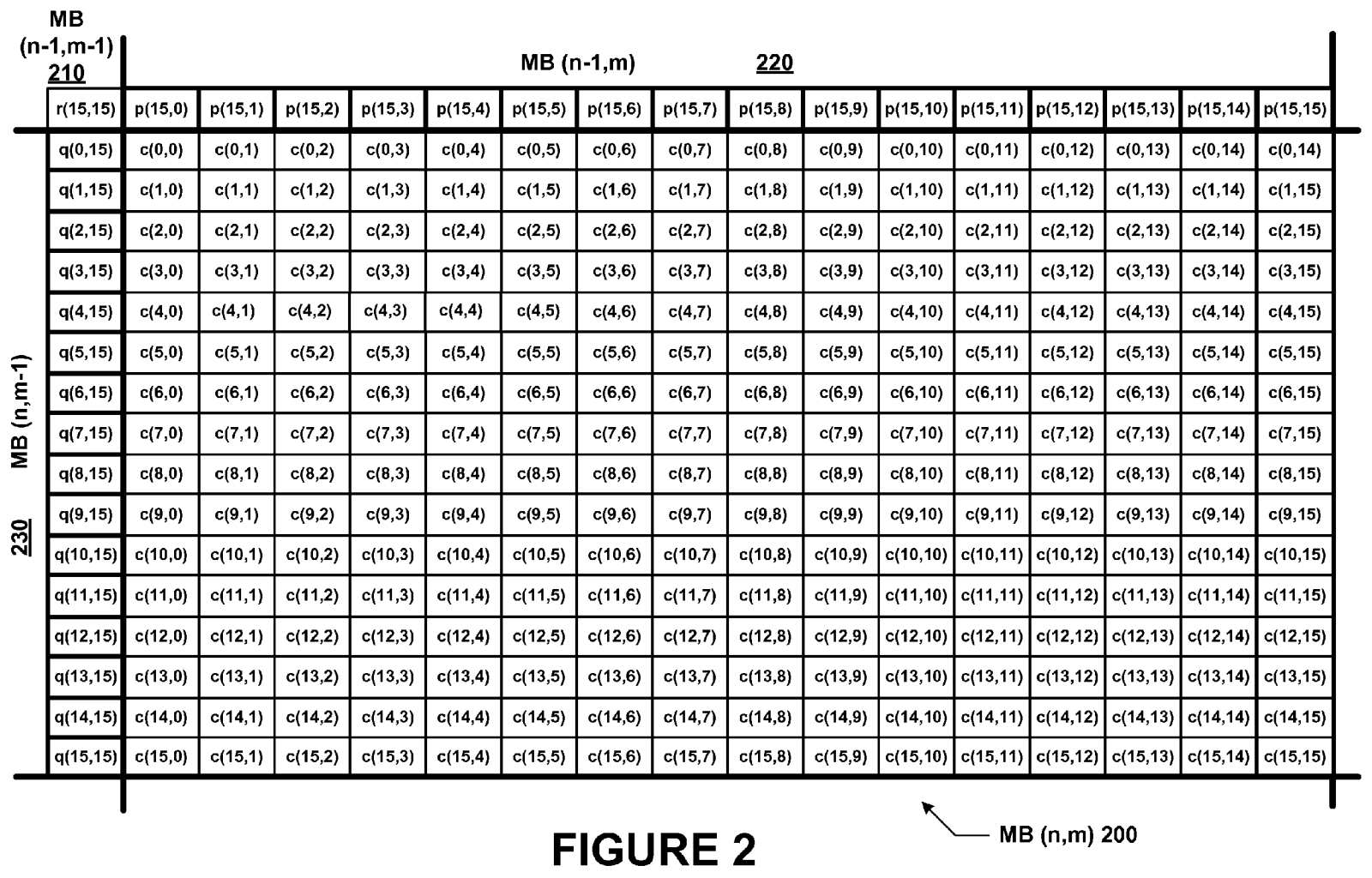

FIG. 2 illustrates a macroblock 200 and portions of neighboring (adjacent) macroblocks 210, 220 and 230 in an image frame. The macroblock 200 may be referred to herein as the current macroblock or as the first macroblock (where "first" is used as a distinguishing identifier and not to indicate order or rank). The macroblock 200 corresponds to macroblock K of FIG. 1. The macroblocks 210, 220 and 230 precede the macroblock 200 through the encoding pipeline of FIG. 1. In the example of FIG. 2, the macroblock 230 corresponds to macroblock K-1.

In one embodiment, the macroblock 200 includes a 16×16 array of pixels or blocks, although the present invention is not so limited. For example, instead of a 16×16 array, the macroblock 200 may include a 4×4 array of blocks. The macroblock 200 does not necessarily have to be square; for example, the macroblock 200 may include a 16×8 array of blocks. In general, the macroblock 200 includes an M×N array of macroblocks.

In FIG. 2, the current macroblock (macroblock 200) is identified as MB(n,m), where 'n' refers to a row of macroblocks within the frame and 'm' refers to a column of macroblocks within the frame. Accordingly, the macroblock 210 is identified as MB(n-1,m-1), the macroblock 220 is identified as MB(n-1,m), and the macroblock 230 is identified as MB(n,m-1). Considering the orientation of the frame in FIG. 2, the macroblock MB(n,m-1) is adjacent to and left of the current macroblock, the macroblock MB(n-1,m) is adjacent to and above the current macroblock, and the macroblock MB(n-1,m-1) is adjacent to both the macroblocks (n,m-1) and (n-1,m) and shares a vertex with the current macroblock.

At the point during processing that is represented in FIG. 2, the macroblock 200 (the current macroblock) consists of raw data. The pixels in the current macroblock are identified as c(x,y), where 'x' is the row number in the current macroblock and 'y' is the column number in the current macroblock. The macroblocks 210 and 220 consist of reconstructed data, and the macroblock 230 either consists of reconstructed data or is in the process of being decoded into reconstructed data.

According to conventional methods, the reconstructed pixels used in the mode decision process include some combination of the following pixels, depending on the macroblock encoding mode being evaluated:

the pixels related to the last (bottom) row of the macroblock 220—pixels p(15,0), p(15,1), . . . , p(15,15);

the pixels related to the last (right-most) column of the macroblock 230—pixels q(0,15), q(1,15), . . . , q(15,15); and/or the last pixel of the last (bottom) row of the macroblock 210—pixel r(15,15).

In contrast to conventional methods, embodiments according to the invention use raw pixel data for the current macroblock (macroblock 200), instead of the reconstructed pixel data listed above, to make a decision about how to encode the current macroblock. More specifically, instead of using the data for the pixels in the last (bottom) row of the macroblock 220 in certain cost calculations, data for the pixels in the first (top) row of the macroblock 200 is used. Similarly, instead of using data for the pixels in the last (right-most) column of the macroblock 230 in certain other cost calculations, data for the pixels in the first (left-most) column of the macroblock 200 is used. Also, instead of using data for the last pixel of the last (bottom) row of the macroblock 210 in yet other cost calculations, data for the first pixel of the first (top) row of the macroblock 200 is used. It is understood that some cost calculations may use combinations of the aforementioned pixel data.

In one embodiment, there are at least four different luma intra-encoding prediction modes considered during the mode decision process—these are referred to herein as horizontal prediction mode, vertical prediction mode, DC (direct current) prediction mode, and plane prediction mode. The RD cost associated with each of these modes is determined using different combinations of the raw data for the current macroblock.

The particular raw data used in the cost calculation for each of these modes is summarized in Table 1 below and discussed further in conjunction with FIGS. 3, 4 and 5.

TABLE 1

| Prediction Mode | Left Pixels | Top Pixels |
| --- | --- | --- |
| Horizontal | c(0, 0), c(1, 0), . . . , c(15, 0) | N/A |
| Vertical | N/A | c(0, 0), c(0, 1), . . . , c(0, 15) |
| DC | c(0, 0), c(1, 0), . . . , c(15, 0) | c(0, 0), c(0, 1), . . . , c(0, 15) |
| Plane | c(0, 0), c(1, 0), . . . , c(15, 0); c(0, 0) in place of r(15, 15) | c(0, 0), c(0, 1), . . . , c(0, 15) |

Figures 3A, 3B, 4A, 4B:
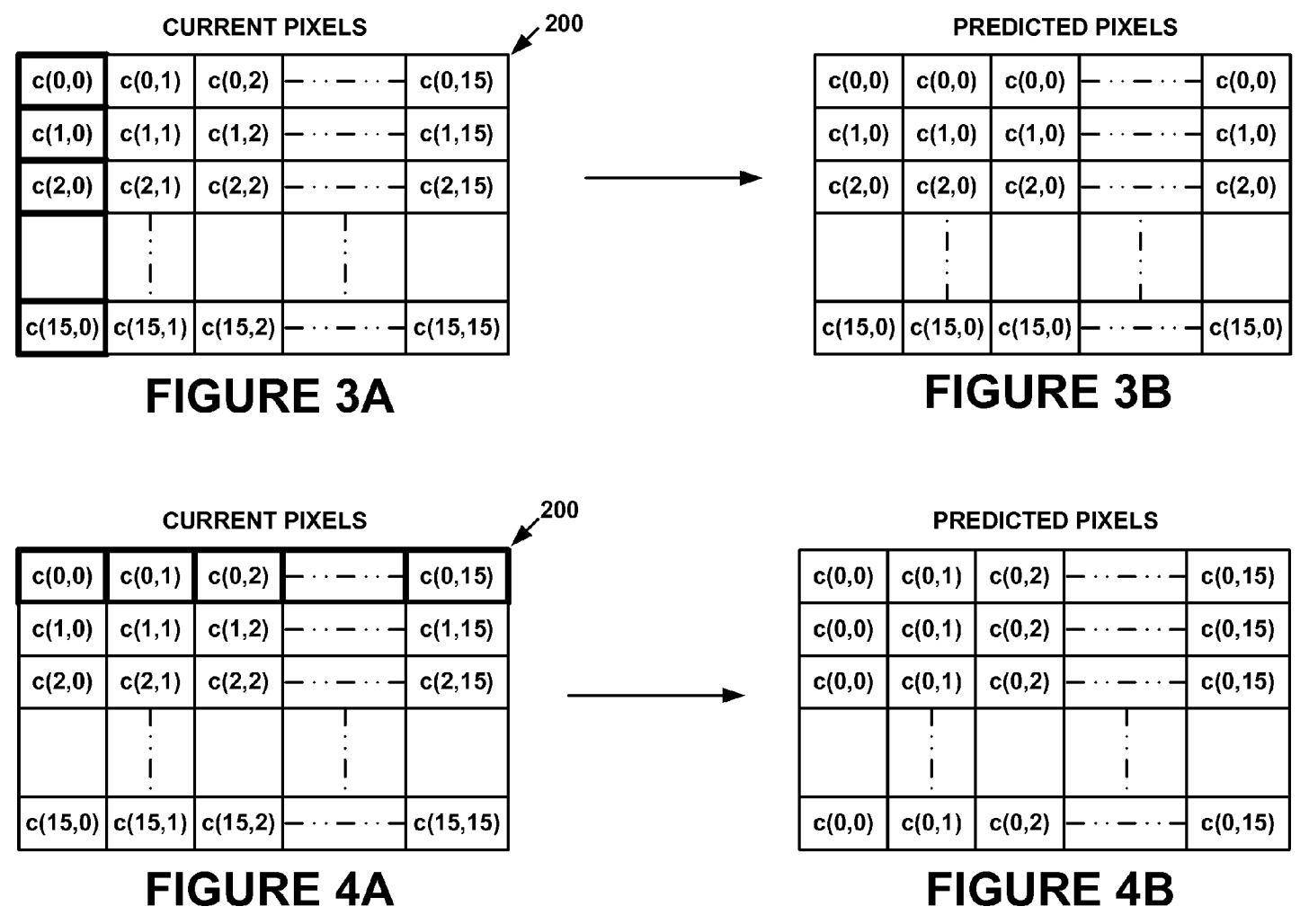

FIGS. 3A and 3B illustrate the horizontal intra-encoding prediction mode according to an embodiment of the present invention. In FIG. 3A, the current macroblock 200 includes raw pixel data as previously described herein. For the RD cost calculation, the first column of raw pixel data is applied across the entire macroblock as shown in FIG. 3B.

FIGS. 4A and 4B illustrate the vertical intra-encoding prediction mode according to an embodiment of the present invention. In FIG. 4A, the current macroblock 200 includes raw pixel data as previously described herein. For the RD cost calculation, the first row of raw pixel data is applied across the entire macroblock as shown in FIG. 4B.

Figures 5A, 5B:
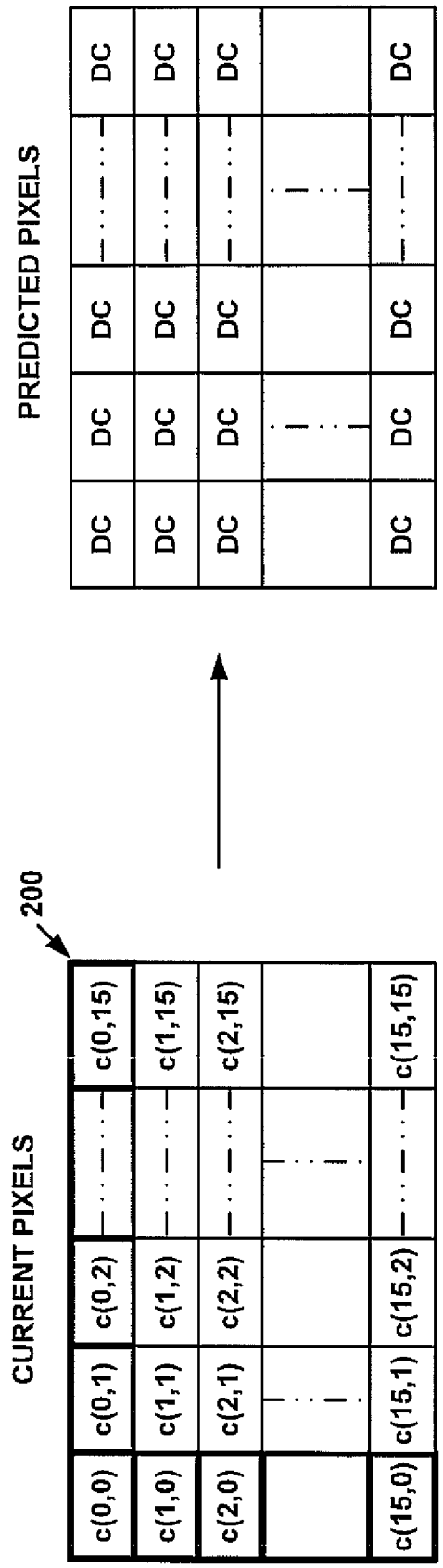
FIGS. 5A and 5B illustrate a third intra-encoding prediction mode according to an embodiment of the invention.

FIGS. 5A and 5B illustrate the DC intra-encoding prediction mode according to an embodiment of the present invention. In FIG. 5A, the current macroblock 200 includes raw pixel data as previously described herein. Using that data, a DC value is calculated as follows:

$$DC=\{(c(0,0)+c(0,1)+\ldots+c(0,15))+(c(0,0)+c(1,0)+\ldots+c(15,0))\}>>5. \quad (1)$$

For the RD cost calculation, the DC value calculated using equation (1) is applied across the entire macroblock as shown in FIG. 5B.

Although each of the examples above is based on a 16×16 array of pixels per macroblock, the present invention is not so limited. For example, the mode decision process described herein can be readily extended to 4×4 luma prediction modes.

The RD cost can be calculated for each of the other H.264 intra-encoding prediction modes using the current macroblock's raw pixel data in a manner similar to that just described. In other words, generally speaking, the cost calculations are preformed as they usually are, except that the current macroblock's raw data is substituted for the corresponding reconstructed data—that is, a row of raw data is substituted for a row of reconstructed data, and so on. The RD cost associated with inter-encoding the current macroblock is calculated in a conventional manner.

FIG. 6 is a flowchart 600 of an example of a computer-implemented method for selecting a macroblock encoding mode according to one embodiment of the present invention. In block 610, raw image data for the current macroblock (e.g., macroblock 200 of FIG. 2) of a current image frame is accessed. In addition, reconstructed data for a corresponding macroblock or macroblocks of a second image frame may also be accessed. The second image frame may precede or follow the current image frame in display order. In other words, the second image frame may be a reference frame such as an I-frame or a P-frame or perhaps a B-frame—according to H.264, a B-frame can be used as a reference frame.

In block 620 of FIG. 6, an RD cost is determined for each intra-encoding mode under consideration. In one embodiment, costs are calculated for each H.264 intra-encoding mode. In another embodiment, costs are calculated for only three of those modes—namely, the horizontal, vertical, and DC prediction modes (Icost-H, Icost-V and Icost-DC, respectively). As described previously herein, these costs are calculated using the raw data for the current macroblock.

In block 630, in one embodiment, the cost (Pcost) for inter-encoding the current macroblock is determined using the reconstructed data from the second image frame mentioned above.

In block 640, the costs calculated in blocks 620 and 630 are compared to determine which is the lowest. In one embodiment, the minimum value of Icost-H, Icost-V and Icost-DC is compared to the value of Pcost. If Pcost is lower than the minimum of Icost-H, Icost-V and Icost-DC, then the current macroblock is inter-encoded. Otherwise, the current macroblock is intra-encoded.

Note that the comparison in block 640 is intended to decide between inter-encoding and intra-encoding and is not necessarily performed to select a type of intra-encoding (if intra-encoding is to be performed), although the comparison could be used in this manner. In other words, if Icost-H, for example, was determined to have the lowest value of all the computed costs (including Pcost), this would not necessarily mean that the current macroblock will be encoded using the horizontal prediction mode, although it could be.

FIG. 7 is a flowchart 700 of an example of a computer-implemented method for computing costs according to one embodiment of the present invention. In block 710, raw (non-encoded) data for a first macroblock (the current macroblock, e.g., the macroblock 200 of FIG. 2) of an image frame is accessed.

In block 720 of FIG. 7, a cost associated with encoding the first macroblock according to a first encoding type is computed. In general, the first encoding type is characterized as intra-encoding. There may be more than one intra-encoding mode under consideration. For example, the horizontal prediction mode, vertical prediction mode, and DC prediction mode may each be evaluated. In one embodiment, a cost is computed for each intra-encoding mode under consideration.

Significantly, as previously described herein, the intra-encoding costs are computed using non-encoded (raw) data from the first (current) macroblock in place of reconstructed image data from at least a second macroblock of the image frame (e.g., one or more of the macroblocks 210, 220 and 230 of FIG. 2). Generally speaking, intra-encoding costs are computed using raw data from the current macroblock instead of reconstructed data from one or more neighboring macroblocks.

In general, as one example, an intra-encoding cost can be computed using, at least in part, non-encoded image data from a first set of contiguous pixels of the first macroblock instead of reconstructed image data from a second set of contiguous pixels of another macroblock, where the first and second sets of pixels are adjacent and parallel. More specifically, the first set of contiguous pixels may include a row (e.g., the top row) of the first macroblock and the second set of contiguous pixels may include a row (e.g., the bottom row) of another macroblock, or the first set of contiguous pixels may include a column (e.g., the left column) of the first macroblock and the second set of contiguous pixels may include a column (e.g., the right column) of another macroblock.

As another example, an intra-encoding cost can be computed using, at least in part, non-encoded image data for a first pixel (e.g., pixel c(0,0) of FIG. 2) of the first macroblock instead of reconstructed image data for a second pixel (e.g., pixel r(15,15) of FIG. 2) of another macroblock, where both macroblocks have a vertex in common.

As yet another example, an intra-encoding cost can be computed using a DC value that is itself computed using non-encoded image data from a column of the first macroblock in combination with non-encoded image data from a row of the first macroblock (using equation (1), for example).

In block 730 of FIG. 7, the intra-encoding costs are used to select an encoding type for the first macroblock. More specifically, the intra-encoding costs can be compared to an inter-encoding cost as described above in conjunction with FIG. 6 in order to make a decision whether to inter-encode or intra-encode the first macroblock. The process of FIG. 7 can then be repeated for each subsequent macroblock in the image frame, and for each subsequent image frame.

Although specific steps are disclosed in the flowcharts 600 and 700, such steps are exemplary. That is, embodiments of the present invention are well-suited to performing various other steps or variations of the steps recited in the flowcharts.

In summary, according to embodiments of the invention, a decision about how to encode a particular macroblock is made using raw data for that macroblock in the cost calculations instead of reconstructed data from one or more other macroblocks. Thus, it is not necessary to wait for reconstructed data to become available for the mode decision process. Consequently, encoder performance is improved because stalls due to the unavailability of reconstructed data are avoided. Also, because the need to store and retrieve reconstructed data for the cost calculations is eliminated, less memory and less bus bandwidth are consumed.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method of encoding image-based data, the method comprising:

accessing a first macroblock of a first image frame, the first macroblock comprising non-encoded data;

computing a first cost associated with encoding the first macroblock according to an intra-encoding mode that makes use of spatial redundancy within the first image frame, wherein the first cost is computed by applying non-encoded data for a first set of pixels of the first macroblock across the entire first macroblock to produce predicted pixels used for computing the first cost, wherein the predicted pixels are: the non-encoded data from a single same column of the first macroblock in place of each column in the first macroblock; the non-encoded data from a single same row of the first macroblock in place of each row in the first macroblock; or the non-encoded data for a single same pixel from the first row of the first macroblock in place of each pixel in the first macroblock; and using the first cost to select an encoding type for the first macroblock, wherein the encoding type is selected from the intra-encoding mode and an inter-encoding mode that makes use of temporal redundancy between the first image frame and a second image frame.

2. The method of claim 1 wherein the first set of pixels comprises contiguous pixels that are adjacent and parallel to a second set of contiguous pixels of a second macroblock of the first image frame.

3. The method of claim 2 wherein the first set of pixels comprises a row of the first macroblock and the second set of contiguous pixels comprises a row of the second macroblock.

4. The method of claim 2 wherein the first set of pixels comprises a column of the first macroblock and the second set of contiguous pixels comprises a column of the second macroblock.

5. The method of claim 1 further comprising computing a second cost using a DC value that is computed using non-encoded image data from a column of the first macroblock in combination with non-encoded image data from a row of the first macroblock.

6. The method of claim 1 wherein the first set of pixels comprises the upper left pixel of the first macroblock.

7. The method of claim 5 further comprising:
computing a third cost associated with encoding the first macroblock according to the inter-encoding mode; and
comparing the first cost, the second cost, and the third cost, wherein the inter-encoding mode is selected if the third cost is less than the minimum of the first cost and the second cost and wherein otherwise the intra-encoding mode is selected.

8. A system for encoding non-encoded video data, the system comprising:
an encoder first stage operable for encoding non-encoded image data for a first macroblock of a first image frame, wherein the first macroblock is encoded according to an encoding type that is selected by comparing a first cost associated with an intra-encoding mode that makes use of spatial redundancy within the first image frame and a second cost associated with an inter-encoding mode that makes use of temporal redundancy between the first image frame and a second image frame; and
an encoder second stage downstream of the first stage and operable for generating reconstructed macroblocks using outputs of the first stage, wherein the first cost is computed by applying non-encoded image data for a first set of pixels of the first macroblock across the entire first macroblock to produce predicted pixels used for computing the first cost, wherein the predicted pixels are: the non-encoded data from a single same column of the first macroblock in place of each column in the first macroblock; the non-encoded data from a single same row of the first macroblock in place of each row in the first macroblock; or the non-encoded data for a single same pixel from the first row of the first macroblock in place of each pixel in the first macroblock.

9. The system of claim 8 further comprising an encoder third stage downstream of the second stage and operable for variable length encoding.

10. The system of claim 8 wherein the first set of pixels comprises contiguous pixels that are adjacent and parallel to a second set of contiguous pixels of a second macroblock of the first image frame.

11. The system of claim 10 wherein the first set of pixels comprises a row of the first macroblock and the second set of contiguous pixels comprises a row of the second macroblock.

12. The system of claim 10 wherein the first set of pixels comprises a column of the first macroblock and the second set of contiguous pixels comprises a column of the second macroblock.

13. The system of claim 8 wherein a third cost is computed using a DC value that is computed using non-encoded image data from a column of the first macroblock in combination with non-encoded image data from a row of the first macroblock.

14. The system of claim 8 wherein the first set of pixels comprises the upper left pixel of the first macroblock.

15. A computer storage device having computer-executable instructions stored thereon, wherein the instructions when executed perform a method of encoding video data, the method comprising:
accessing non-encoded image data associated with a first macroblock of a first frame of video data;
using the non-encoded image data for the first macroblock to compute a first cost associated with intra-encoding the first macroblock, wherein the first cost is computed by applying non-encoded data for a first set of pixels of the first macroblock across the entire first macroblock to produce predicted pixels used for computing the first cost, wherein the predicted pixels are: the non-encoded data from a single same column of the first macroblock in place of each column in the first macroblock; the non-encoded data from a single same row of the first macroblock in place of each row in the first macroblock; or the non-encoded data for a single same pixel from the first row of the first macroblock in place of each pixel in the first macroblock;
using reconstructed image data associated with a second frame of video data to compute a second cost associated with inter-encoding the first macroblock; and
comparing the first and second costs to select one of intra-encoding and inter-encoding to encode the first macroblock.

16. The computer storage device of claim 15 wherein the first set of pixels comprises contiguous pixels that are adjacent and parallel to a second set of contiguous pixels of a second macroblock of the first frame.

17. The computer storage device of claim 15 wherein the method further comprises:
computing a third cost using a DC value that is computed using non-encoded image data from a column of the first macroblock in combination with non-encoded image data from a row of the first macroblock; and
comparing the first cost, the second cost, and the third cost, wherein the inter-encoding mode is selected if the third cost is less than the minimum of the first cost and the second cost and wherein otherwise the intra-encoding mode is selected.

18. The computer storage device of claim 15 wherein the first set of pixels comprises the upper left pixel of the first macroblock.

* * * * *